(12) United States Patent
Takeda et al.

(10) Patent No.: US 12,302,774 B2
(45) Date of Patent: May 20, 2025

(54) AGRICULTURE ASSISTANCE SYSTEM

(71) Applicant: KUBOTA CORPORATION, Osaka (JP)

(72) Inventors: Shuji Takeda, Osaka (JP); Yoshiharu Yoshimoto, Osaka (JP); Masayuki Yao, Osaka (JP); Tomohiro Nishikawa, Osaka (JP); Kazuya Hirazawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 850 days.

(21) Appl. No.: 17/532,356

(22) Filed: Nov. 22, 2021

(65) Prior Publication Data

US 2022/0078964 A1    Mar. 17, 2022

Related U.S. Application Data

(63) Continuation of application No. PCT/JP2020/024415, filed on Jun. 22, 2020.

(30) Foreign Application Priority Data

Jun. 28, 2019  (JP) ................. 2019-121622

(51) Int. Cl.
*A01B 79/00* (2006.01)
*A01G 25/02* (2006.01)

(52) U.S. Cl.
CPC ............ *A01B 79/005* (2013.01); *A01G 25/02* (2013.01)

(58) Field of Classification Search
CPC ............................... A01B 79/005; A01G 25/02
See application file for complete search history.

(56) References Cited

U.S. PATENT DOCUMENTS 5,467,271 A * 11/1995 Abel .................... A01B 79/005
                                              702/5
6,199,000 B1 * 3/2001 Keller ................. A01B 79/005
                                              342/357.62
(Continued)

FOREIGN PATENT DOCUMENTS

JP    2000-014208 A    1/2000
JP    2008-278816 A    11/2008
(Continued)

OTHER PUBLICATIONS

International Search Report issued in International Application PCT/JP2020/024415, dated Jul. 28, 2020 along with English Translation thereof.
(Continued)

*Primary Examiner* — Gertrude Arthur Jeanglaude
(74) *Attorney, Agent, or Firm* — Greenblum & Bernstein, P.L.C.

(57) ABSTRACT

An agriculture assistance system includes a data setting unit configured or programmed to associate agricultural data at a predetermined position in an agricultural field to a plurality of areas set in the agricultural field, and to set the associated agricultural data as data corresponding to the respective areas, an area setting unit configured or programmed to set the areas in the agricultural field, and a map display unit configured or programmed to display the data corresponding to the respective areas. When the areas set by the area setting unit are changed, the data setting unit is configured or programmed to reassociate the data to the areas after the change.

10 Claims, 14 Drawing Sheets

(56) References Cited

U.S. PATENT DOCUMENTS

| | | | | |
|---|---|---|---|---|
| 11,212,954 B2* | 1/2022 | Maeder | ................ | A01B 69/008 |
| 11,793,101 B2* | 10/2023 | Bogdan | ................. | A01B 76/00 |
| 2009/0099737 A1* | 4/2009 | Wendte | ............. | A01D 41/1243 |
| | | | | 701/50 |
| 2020/0128726 A1* | 4/2020 | Takeda | ................ | G01C 21/005 |
| 2020/0154639 A1* | 5/2020 | Takahara | ............ | A01B 79/005 |

FOREIGN PATENT DOCUMENTS

| | | |
|---|---|---|
| JP | 2011-254711 A | 12/2011 |
| JP | 2017-102924 A | 6/2017 |
| JP | 2017-224224 A | 12/2017 |
| WO | 2019/003851 A1 | 1/2019 |
| WO | 2019/004305 A1 | 1/2019 |

OTHER PUBLICATIONS

Written Opinion of the International Searching Authority issued in International Application PCT/JP2020/024415, dated Jul. 28, 2020, along with English Translation thereof.

* cited by examiner

Fig.3

| GROUP | CLASSIFIED DATA D1n |
|---|---|
| FIRST GROUP G1 | LESS THAN 500 |
| SECOND GROUP G2 | 500 OR MORE AND LESS THAN 600 |
| THIRD GROUP G3 | 600 OR MORE AND LESS THAN 700 |
| FOURTH GROUP G4 | 700 OR MORE AND LESS THAN 800 |
| FIFTH GROUP G5 | 800 OR MORE |

| GROUP | CLASSIFIED DATA D2n |
|---|---|
| FIRST GROUP G1 | LESS THAN 500 |
| SECOND GROUP G2 | 500 OR MORE AND LESS THAN 600 |
| THIRD GROUP G3 | 600 OR MORE AND LESS THAN 700 |
| FOURTH GROUP G4 | 700 OR MORE AND LESS THAN 800 |
| FIFTH GROUP G5 | 800 OR MORE |

Fig.4

SELECT AGRICULTURAL FIELD

WORK PERIOD 2016/04/01 ~ 2017/10/31
NAME OF AGRICULTURAL FIELD [          ]  🔍 DISPLAY LIST      [ SELECT ]
(PARTIAL MATCH)

| NAME OF AGRICULTURAL FIELD | START OF WORK | END OF WORK |
|---|---|---|
| ○ AGRICULTURAL FIELD A | 2016/04/01 6:30 | 2016/04/01 8:43 |
| ○ AGRICULTURAL FIELD B | 2016/04/02 6:40 | 2016/04/02 8:42 |
| ○ AGRICULTURAL FIELD C | 2016/04/04 6:32 | 2016/04/04 8:38 |
| ○ AGRICULTURAL FIELD B | 2016/04/04 12:20 | 2016/04/04 14:35 |
| ◉ AGRICULTURAL FIELD A | 2016/04/05 6:35 | 2016/04/05 8:44 |
| ○ AGRICULTURAL FIELD D | 2016/04/08 6:30 | 2016/04/08 8:43 |
| ○ AGRICULTURAL FIELD E | 2016/04/08 12:17 | 2016/04/08 15:02 |
| ○ AGRICULTURAL FIELD A | 2016/04/09 6:35 | 2016/04/09 8:41 |
| ○ AGRICULTURAL FIELD C | 2016/04/10 6:34 | 2016/04/10 8:44 |
| ○ AGRICULTURAL FIELD B | 2016/04/11 6:41 | 2016/04/11 8:43 |
| ○ AGRICULTURAL FIELD F | 2016/04/12 5:58 | 2016/04/12 8:45 |
| ○ AGRICULTURAL FIELD C | 2016/04/13 6:15 | 2016/04/13 8:38 |
| ○ AGRICULTURAL FIELD B | 2016/04/16 6:28 | 2016/04/16 8:38 |
| ○ AGRICULTURAL FIELD E | 2016/04/16 12:21 | 2016/04/16 14:59 |
| ○ AGRICULTURAL FIELD G | 2016/04/17 5:54 | 2016/04/17 8:44 |
| ○ AGRICULTURAL FIELD E | 2016/04/18 5:58 | 2016/04/18 8:43 |
| ○ AGRICULTURAL FIELD A | 2016/04/18 12:14 | 2016/04/18 15:32 |
| ○ AGRICULTURAL FIELD B | 2016/04/19 12:22 | 2016/04/19 15:24 |
| ○ AGRICULTURAL FIELD F | 2016/04/20 5:56 | 2016/04/20 8:42 |
| ○ AGRICULTURAL FIELD H | 2016/04/21 6:10 | 2016/04/21 8:46 |

| | | |
|---|---|---|
| NAME OF FACILITY | 4 TAN ADJACENT AREAS (SOUTH)_CONFIRMED_END COLOR | |
| MESH SIZE | 5m | ☐ FERTILIZATION MAP ADOPTION FLAG — 100 |
| MAP | VEGETATION MAP | |
| FERTILIZER NAME | | FERTILIZATION |
| UNIT PRICE | | SIMPLE  ALL 14   SELECT |
| SPECIFIC GRAVITY | | 100  YEN / Kg |
| REFERENCE AMOUNT PER 10 g | 14 g — 101 | |
| THREE MAJOR ELEMENTS | N: 14 %   P: 14 %   K: 14 % — 54e | |

87.56Kg (20.33kg/10a) — 54c

TOTAL (AVERAGE) (13.42)

COST
- G5  ~10.00         30.00 kg/10a  N:4.2kg  P:4.2kg  K:4.2kg    30 YEN — $V_i(i=5)$  ← $P_i(i=5)$
- G4  10.01~12.50    25.00 kg/10a  N:3.5kg  P:3.5kg  K:3.5kg   4,439 YEN — $V_i(i=4)$
- G3  12.51~15.00    20.00 kg/10a  N:2.8kg  P:2.8kg  K:2.8kg   2,018 YEN — $V_i(i=3)$
- G2  15.01~17.50    15.00 kg/10a  N:2.1kg  P:2.1kg  K:2.1kg   2,269 YEN — $V_i(i=2)$
- G1  17.51~         10.00 kg/10a  N:1.4kg  P:1.4kg  K:1.4kg       0 YEN — $V_i(i=1)$
                                                           ↑ $P_i(i=1)$

RANGE

T8

Fig.12
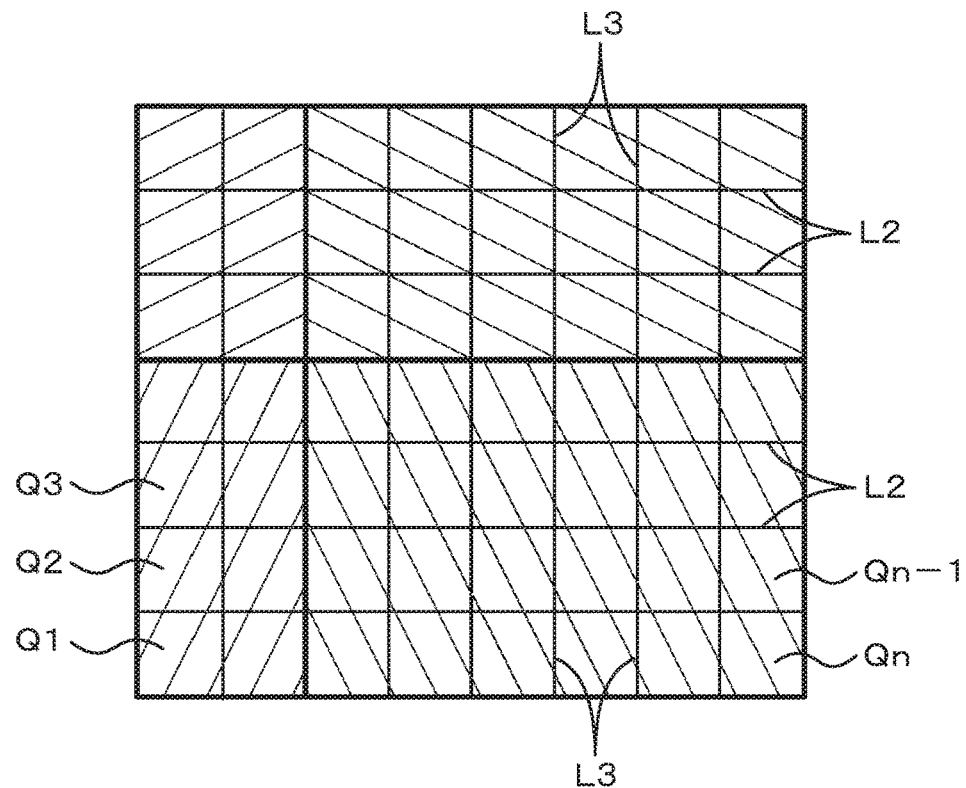
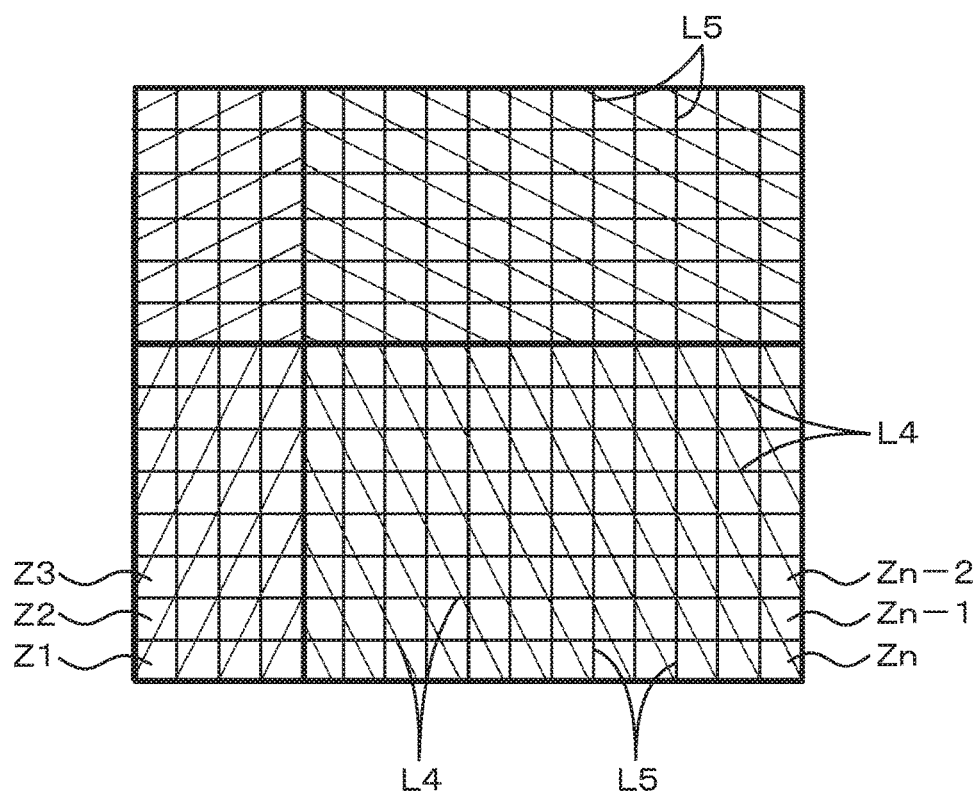

AGRICULTURE ASSISTANCE SYSTEM

CROSS REFERENCE TO RELATED APPLICATIONS

This application is a continuation application of International Application No. PCT/JP2020/024415, filed on Jun. 22, 2020, which claims the benefit of priority to Japanese Patent Application No. 2019-121622, filed on Jun. 28, 2019. The entire contents of each of these applications are hereby incorporated herein by reference.

BACKGROUND OF THE INVENTION

1. Field of the Invention

The present invention relates to an agriculture assistance system.

2. Description of the Related Art

As a technique of displaying agricultural data for each predetermined mesh (area), a technique described in Japanese Unexamined Patent Application Publication No. 2011-254711 has been conventionally known.

A fertilization map generating system according to Japanese Unexamined Patent Application Publication No. 2011-254711 includes a hot-water extracted nitrogen amount calculation unit that obtains a relationship between a reflectance of natural light and a hot-water extracted nitrogen amount at a survey point, based on image data and environmental light amount data in an agricultural field, each of which is obtained by remote sensing, and soil sampling data obtained by analyzing fertilizer components contained in soil, a reflectance calculation unit that calculates a reflectance of natural light in the agricultural field for each predetermined mesh based on the data obtained by the remote sensing, and a first thematic map creation unit that creates a hot-water extracted nitrogen map in mesh units of the agricultural field, based on the relationship between the reflectance of natural light and the hot-water extracted nitrogen amount at the survey point, and data of the reflectance of natural light for each mesh in the agricultural field, which is obtained by the reflectance calculation unit.

SUMMARY OF THE INVENTION

The technique of Japanese Unexamined Patent Application Publication No. 2011-254711 obtains the reflectance of natural light based on the image data, the environmental light amount data, and the soil sampling data, and creates the hot-water extracted nitrogen map based on the reflectance of natural light for each mesh. The agricultural field has various kinds of shapes, and meshes when creating the hot-water extracted nitrogen map have various kinds of sizes. Hence, there is a case where the created hot-water extracted nitrogen map for each mesh becomes an unintended map, which makes it difficult to refer to data for each mesh in the agricultural field for agricultural work.

In view of the problem described above, the present invention is directed to provision of an agriculture assistance system capable of obtaining a map in correspondence to an actual agricultural field and agricultural work.

A technical means according to the present invention to solve this technical problem is characterized by the following points.

An agriculture assistance system includes a data setting unit configured or programmed to associate agricultural data at a predetermined position in an agricultural field to a plurality of areas set in the agricultural field, and to set the associated agricultural data as data corresponding to the respective areas, an area setting unit configured or programmed to set the areas in the agricultural field, and a map display unit configured or programmed to display the data corresponding to the respective areas. When the areas set by the area setting unit are changed, the data setting unit is configured or programmed to reassociate the data to the areas after the change.

The area setting unit is configured or programmed to accept reference lines to define the plurality of areas, and to set the areas defined by the accepted reference lines.

The area setting unit is configured or programmed to change an area of the plurality of areas, the area to be changed corresponding to an end of the agricultural field.

The map display unit is configured or programmed to display, in the agricultural field, areas different in size from the areas used for the data setting by the data setting unit.

The agriculture assistance system further includes a group setting unit configured or programmed to classify the data corresponding to the respective areas into groups, and a first spread setting unit configured or programmed to set an amount of spread matters spread over the agricultural field for each of the groups, and to set the amount of spread matters for each of the areas in correspondence to the data constituting the corresponding group. The map display unit is configured or programmed to display the amount of spread matters set for the respective areas in the agricultural field.

The agriculture assistance system further includes a group setting unit configured or programmed to classify the data corresponding to the respective areas into groups, and a second spread setting unit configured or programmed to set an amount of spread matters for each of the groups, and to set the amount of spread matters for an optional one of the areas. The map display unit is configured or programmed to display the amount of spread matters set for the optional area in the agricultural field.

The agriculture assistance system further includes a component acquiring unit configured or programmed to acquire a chemical component of spread matters, a component calculation unit configured or programmed to calculate a component amount for each of the groups based on the chemical component of spread matters acquired by the component acquiring unit and the amount of spread matters set for each of the groups.

The area setting unit is configured or programmed to determine a value of data displayed in correspondence to a changed area after the change of areas based on a first acreage of the area before the change and a second acreage of the area before the change.

The agriculture assistance system further includes a total amount of spread matters display unit configured or programmed to display a total amount of spread matters spread over the agricultural field.

The agriculture assistance system further includes a cost display unit configured or programmed to display cost for spreading spread matters.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is a diagram illustrating a relationship between data Dn and groups.

FIG. 4 is a diagram illustrating a list T2.

FIG. 10 is a diagram illustrating an example of a setting screen T8.

FIG. 12 is a diagram illustrating an example in a case where a display mesh is changed.

DETAILED DESCRIPTION OF THE PREFERRED EMBODIMENTS

Figure 1:
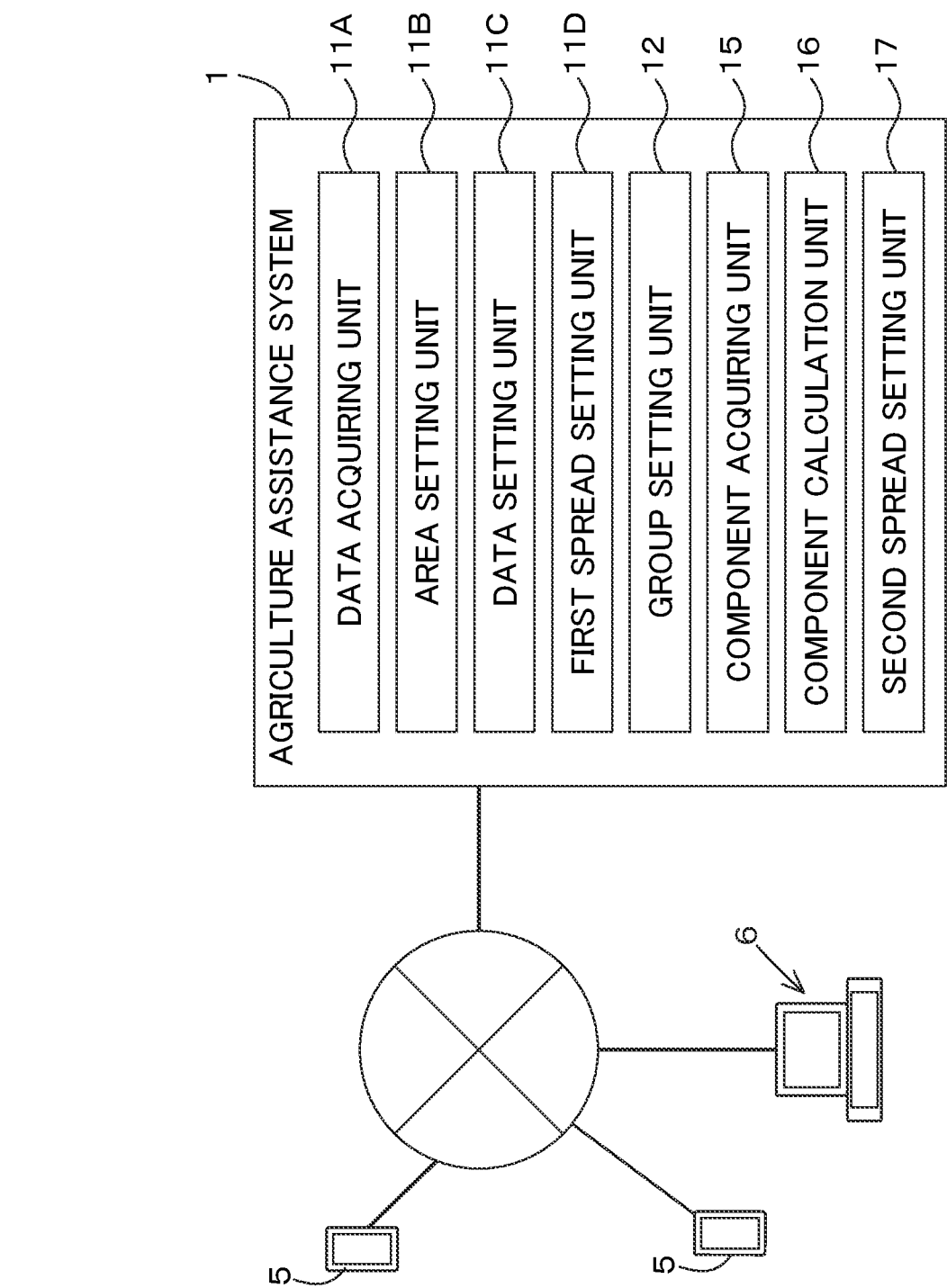
FIG. 1 is a diagram illustrating an agriculture assistance system according to a first embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Exemplary embodiments of the present invention will be described below with reference to the accompanying drawings.

FIG. 1 illustrates an agriculture assistance system 1. The agriculture assistance system 1 is, for example, a system of assisting in spreading spread matters. Examples of the spread matters (spread agents) include chemicals (agricultural chemicals) and fertilizers.

As illustrated in FIG. 1, the agriculture assistance system 1 is a server to which a mobile terminal 5 such as a smartphone or a tablet, and a fixed terminal 6 such as a personal computer are connected. The agriculture assistance system 1 includes a database 2. The database 2 stores various kinds of agricultural data regarding agriculture. The agricultural data includes crop component data, soil data, yield data, and growth data. Each of the soil data, the yield data, and the growth data is, for example, data obtained by remote sensing or the like.

The crop component data indicates, for example, a water amount (water content) of a crop, eating quality (protein content) of the crop, or the like, and is, for example, data obtained from a harvesting machine or the like at the time of harvesting the crop. The soil data is data indicating chemical components of soil, and is data obtained by an analyzer analyzing a sample of the soil taken by a soil sampling machine. The yield data indicates a weight (yield) of a harvest, and is, for example, data obtained when the crop is harvested by the harvesting machine.

The growth data is data indicating a growth situation of the crop, and is, for example, data that is obtained by capturing an image of the crop by an unmanned air vehicle such as a multicopter and analyzing the captured image, and that is represented by vegetation indexes, such as a difference vegetation index (DVI), a radar vegetation index (RVI), a normalized difference vegetation index (NDVI), a green normalized difference vegetation index (GNDVI), a soil adjusted vegetation index (SAVI), a transformed soil adjusted vegetation index (TSAVI), a cellulose absorption index (CAI), a medium resolution imaging spectrometer terrestrial chlorophyll index (MTCI), a red-edge position (REP), a photochemical reflectance index (PRI), and a ratio spectral index (RSI).

Each agricultural data (the crop component data, the soil data, the yield data, and the growth data) is data in which positional information (for example, a latitude and a longitude) and a data value are associated to each other. The following description is given assuming that the agricultural data includes the positional information.

The agriculture assistance system 1 is capable of creating a spread plan based on the agricultural data (the crop component data, the soil data, the yield data, and the growth data). The spread plan is a plan for setting, in at least a predetermined agricultural field, how much amount of spread matters (fertilizers, chemicals, and the like) are to be spread and over which portion of the agricultural field the spread matters are to be spread.

Figure 2:
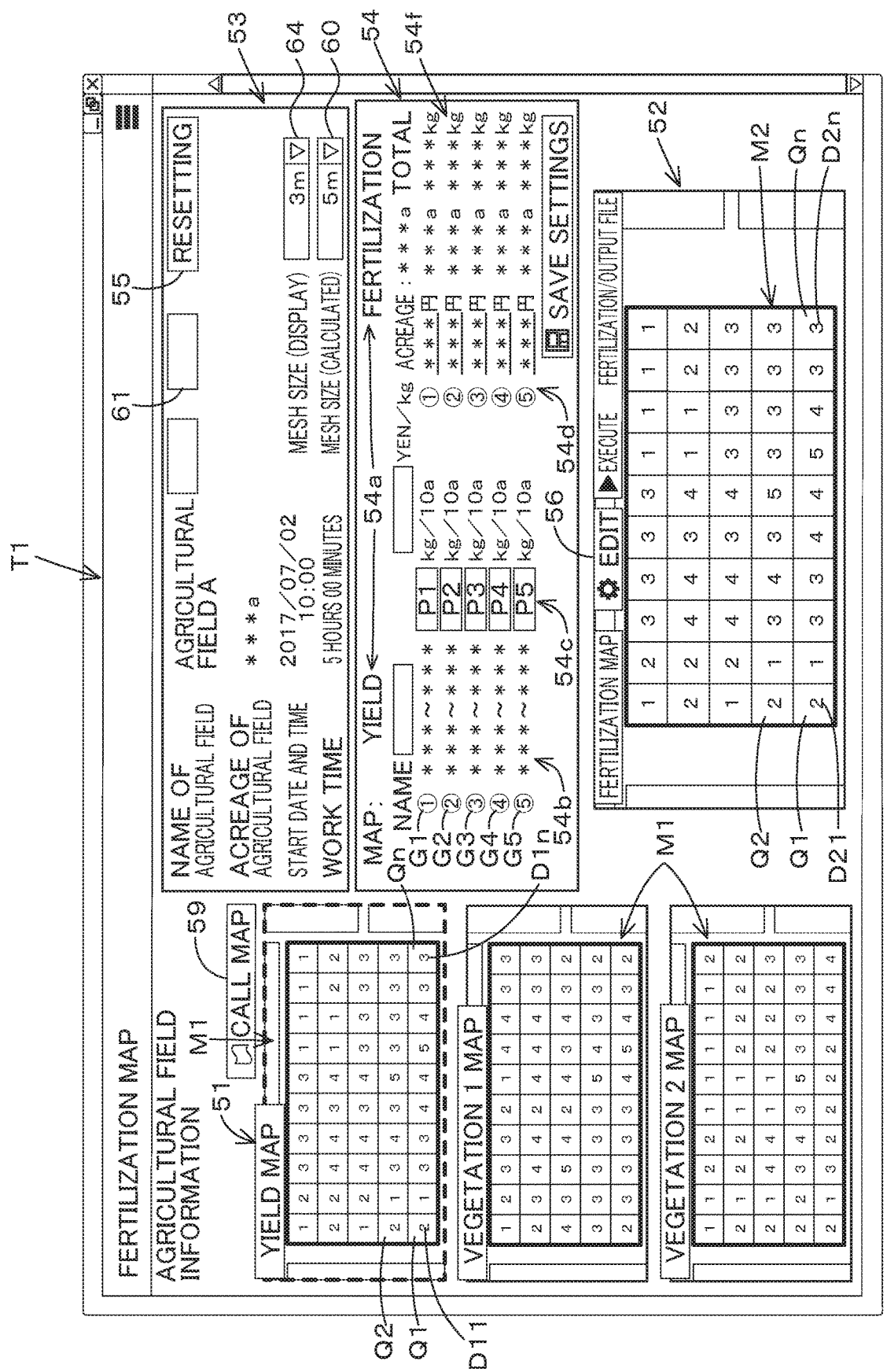
FIG. 2 is a diagram illustrating a setting screen T1.

For example, when either the mobile terminal 5 or the fixed terminal 6 is connected to the agriculture assistance system 1, the agriculture assistance system 1 displays a setting screen T1 for developing the spread plan on a display unit, such as a monitor of the mobile terminal 5 or a monitor of the fixed terminal 6, as illustrated in FIG. 2.

The setting screen T1 includes a map display unit capable of displaying data Dn for each area Qn, a basic display unit 53, and a spread design unit 54. The map display unit includes a first display unit 51 and a second display unit 52.

The first display unit 51 displays a map obtained from data referred to when the spread plan is created. For example, the first display unit 51 displays a first agricultural field map [a crop component map (a water map, an eating quality map, or the like), a soil map, a yield map, or a growth map] M1 individually created based on the corresponding agricultural data (the crop component data, the soil data, the yield data, or the growth data).

In a case where a plurality of first agricultural field maps M1 is displayed on the first display unit 51, any first agricultural field map M1 can be selected from the plurality of first agricultural field maps M1 on the first display unit 51. For the sake of convenience of description, the first agricultural field map M1 selected on the first display unit 51 is referred to as a "selected agricultural field map".

The first agricultural field map M1 is a mesh-type map in which one agricultural field is divided into a plurality of areas Qn (n=1, 2, 3, . . . n). In addition, the first agricultural field map M1 is a map in which a plurality of groups (a plurality of ranks) is allocated to pieces of data Dn (n=1, 2, 3, . . . n) corresponding to the respective areas Qn in correspondence to respective sizes (values) of the pieces of data Dn. That is, in the first agricultural field map M1, a group (rank) is indicated by a color, a numeric value, a text, or the like so that a preliminarily allocated group (rank) can be identified for each of the plurality of areas Qn. In an example of FIG. 2, a numeric value indicated in each of the plurality of areas Qn in the first agricultural field map M1 indicates the group.

For example, as illustrated in FIG. 3, the data Dn is classified into groups of five stages in correspondence to numeric values, and a group having the smallest numeric value is allocated as a [first group G1], and a group having the largest numeric value is allocated as a [fifth group G5]. Those groups are allocated, in ascending order of the numeric values thereof, as a [second group G2], a [third group G3], and a [fourth group G4] between the [first group G1] and the [fifth group G5]. Note that how many groups the data Dn is classified into is optionally determined, and the number is not limited to that of the example described above. The numeric values indicated in FIG. 3 are numeric values for describing grouping, and not specifically limited.

The second display unit 52 displays a second agricultural field map (an amount of spread matters map) M2 including an amount of spread matters set based on the first agricultural field map M1 displayed on the first display unit 51. The second agricultural field map M2 is, similarly to the first display unit 51, a mesh-type map in which one agricultural field is divided into a plurality of areas Qn, and a length of a mesh width (a width of each area) and the number of meshes (the number of areas) are set in correspondence to and similarly to the first agricultural field map M1. The second agricultural field map M2 is a map in which a plurality of groups is allocated to pieces of data Dn corresponding to the respective areas Qn in correspondence to respective sizes (values) of the pieces of data Dn. That is, in the second agricultural field map M2, a group (rank) is indicated by a color, a numeric value, a text, or the like so that a preliminarily allocated group (rank) can be identified for each of the plurality of areas Qn. In the example of FIG. 2, a numeric value indicated in each of the plurality of areas Qn in the second agricultural field map M2 indicates the group.

For example, as illustrated in FIG. 3, the data Dn is classified into groups of five stages in correspondence to the numeric values, and the group having the smallest numeric value is allocated as the [first group G1], and the group having the largest numeric value is allocated as the [fifth group G5]. Those groups are allocated, in ascending order of the numeric values thereof, as the [second group G2], the [third group G3], and the [fourth group G4] between the [first group G1] and the [fifth group G5]. That is, the number of groups allocated to the respective pieces of data Dn in the first agricultural field map M1 is identical to the number of groups allocated to the respective pieces of data Dn in the second agricultural field map M2. Note that how many groups the data Dn is classified into is optionally determined, and the number is not limited to that of the example described above. The numeric values indicated in FIG. 3 are numeric values for describing grouping, and not specifically limited.

The basic display unit 53 displays information regarding the agricultural field to which a fertilization plan is set (agricultural field information). The basic display unit 53 displays a name of an agricultural field and an acreage of an agricultural field that are registered in the agriculture assistance system 1. The basic display unit 53 may display basic information of the selected agricultural field map M1 selected from the first agricultural field maps M1 displayed on the first display unit 51. For example, in a case where the selected agricultural field map M1 is the yield map, a date and time of harvesting the crop, a name of a harvesting machine that has harvested the crop, a model number of the harvesting machine, and the like are displayed as the basic information.

The spread design unit 54 is a portion to which information necessary for setting an amount of spread matters can be input, and includes a name display unit 54a, a group display unit 54b, a spread input unit (input unit) 54c, and a cost display unit 54d.

The name display unit 54a displays a name of the first agricultural field map (selected agricultural field map) M1 selected on the first display unit 51, and a name of the second agricultural field map M2. The group display unit 54b displays a plurality of groups set in the first agricultural field map (selected agricultural field map) M1. In addition, the group display unit 54b displays a range of the data Dn corresponding to each group, that is, a reference value for classifying the data Dn into groups.

The spread input unit 54c is a portion to which a set amount of spread matters set for each group is input. The spread input unit 54c includes a first input unit to which a set amount of spread matters P1 corresponding to the first group G1 is input, a second input unit to which a set amount of spread matters P2 corresponding to the second group G2 is input, a third input unit to which a set amount of spread matters P3 corresponding to the third group G3 is input, a fourth input unit to which a set amount of spread matters P4 corresponding to the fourth group G4 is input, and a fifth input unit to which a set amount of spread matters P5 corresponding to the fifth group G5 is input. Note that a value (set amount of spread matters) input to the spread input unit 54c may be an amount of spread matters per unit area, or another value that is optionally determined.

The cost display unit 54d displays cost related to spreading of spread matters (cost for spreading spread matters). The cost for spreading spread matters includes, for example, cost for purchasing spread matters for each group obtained from the set amount of spread matters input to the spread input unit 54c.

The agriculture assistance system 1, for example, calculates the cost for purchasing spread matters for each group from an amount of money for spread matters per kilogram to obtain cost for purchase for each group. The cost display unit 54d displays cost for spreading spread matters for each group obtained from the cost for purchase for each group, or displays total cost for spreading spread matters obtained from cost for purchasing spread matters for the whole of the agricultural field (total cost for purchase) obtained by aggregating cost for purchase for each group. That is, the cost display unit 54d displays the cost for spreading spread matters for each group or the cost for spreading spread matters for the whole of the agricultural field. Note that the cost for spreading spread matters is only required to be obtained using the amount of spread matters or the like, and cost including not only the cost for purchase, but also transportation cost, labor cost, and other various kinds of cost may be input.

In addition, the agriculture assistance system 1 calculates a total amount of spread matters for each group from the set amount of spread matters set for each group (the total amount of spread matters=the predetermined total number of groups in the agricultural field×the set amount of spread matters). A total amount of spread matters display unit 54f on the setting screen T1 displays the total amount of spread matters (the total amount of spread matters for each group).

Note that in the embodiment described above, the total amount of spread matters display unit 54f displays the total amount of spread matters for each group, but may display an amount of spread matters for the whole of the agricultural field (an amount of spread matters obtained by aggregating the total amount of spread matters for each group) as the total amount of spread matters.

Therefore, an administrator, a worker, and the like can set an amount of spread matters in the agricultural field for each predetermined area using the setting screen T1 displayed in either the mobile terminal 5 or the fixed terminal 6.

Subsequently, a description will be given of details of operations of the agriculture assistance system 1 at the time of operating the setting screen T1 or the like, and a method of creating the spread plan (setting the amount of spread matters).

As illustrated in FIG. 1, the agriculture assistance system 1 includes a data acquiring unit 11A, an area setting unit 11B, and a data setting unit 11C. Each of the data acquiring unit 11A, the area setting unit 11B, and the data setting unit 11C includes an electric/electronic component and/or an electric circuit arranged in the agriculture assistance system 1, and/or a program stored in the agriculture assistance system 1, and/or the like.

The data acquiring unit 11A executes processing of acquiring at least one agricultural data out of the plurality of pieces of agricultural data (the crop component data, the soil data, the yield data, and the growth data) (acquisition step). For example, when a map call button 59 is selected with an input interface, such as a mouse or a keyboard, on the setting screen T1, the data acquiring unit 11A is activated, and the acquisition step is thereby started. The data acquiring unit 11A refers to the database 2 of the agriculture assistance system 1 and displays a list T2 of the agricultural data (the crop component data, the soil data, the yield data, and the growth data) on either the mobile terminal 5 or the fixed terminal 6, as illustrated in FIG. 4. When one agricultural data is selected from the list T2, the data acquiring unit 11A calls the agricultural data selected from the list T2 from the database 2 to acquire the agricultural data corresponding to one agricultural field (which may be hereinafter referred to as agricultural field data) from the database 2, and the acquisition step ends.

The area setting unit 11B performs processing of making a setting of the area Qn (area setting processing) with respect to the agricultural field corresponding to the agricultural data (agricultural field data) acquired by the data acquiring unit 11A (this agricultural field may be hereinafter referred to as a set agricultural field). In the area setting processing, processing of dividing the set agricultural field into a plurality of areas Qn based on a mesh size (a set mesh) input to a size input unit 60 of the basic display unit 53 and a preset reference line L1.

Figure 5:
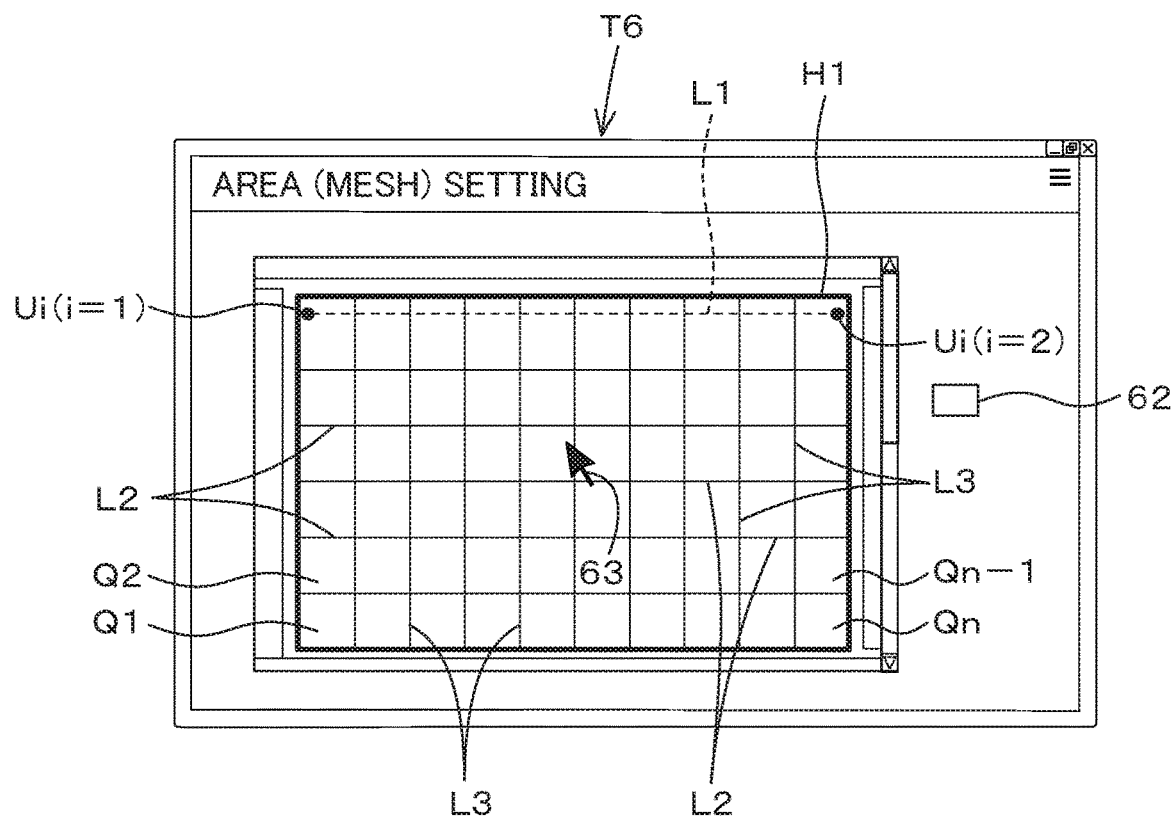
FIG. 5 is a diagram illustrating an example of a setting screen T6.

For example, when an area setting button 61 displayed on the setting screen T1 is selected, a setting screen T6 for setting the area Qn is displayed as illustrated in FIG. 5. A shape of the set agricultural field, that is, a contour H1 is displayed on the setting screen T6. When a reference setting button 62 is selected on the setting screen T6, a pointer 63 is displayed on the setting screen T6.

When a certain point on the set agricultural field is selected with the pointer 63, the area setting unit 11B holds a position of a selected point Ui (i=1, 2, 3, . . . i, the number of selections). In addition, the area setting unit 11B sets a straight line connecting points Ui as the reference line L1.

For example, as illustrated in FIG. 5, when two points of points U1 and U2 are selected on the set agricultural field, the area setting unit 11B holds the points U1 and U2. The area setting unit 11B sets a straight line connecting the points U1 and U2 as the reference line L1. The area setting unit 11B sets a first boundary line (parallel boundary line) L2 in the area Qn at a position in parallel with the reference line L1 and away from the reference line L1 by a value of a mesh size. The area setting unit 11B performs copy of the boundary line (parallel boundary line) L2 at a position in parallel with the reference line L1 and away from the boundary line L2 by the value of the mesh size, and thereby creates a plurality of boundary lines (parallel boundary lines) L2 in parallel with the reference line L1 on the set agricultural field.

The area setting unit 11B also creates a plurality of boundary lines (orthogonal boundary lines) L3 that is orthogonal to each of the plurality of boundary lines (parallel boundary lines) L2 and that has an interval of the mesh size. The area setting unit 11B sets a plurality of areas each surrounded by the parallel boundary lines L2 and the orthogonal boundary lines L3 as the areas Qn.

Figure 6A:
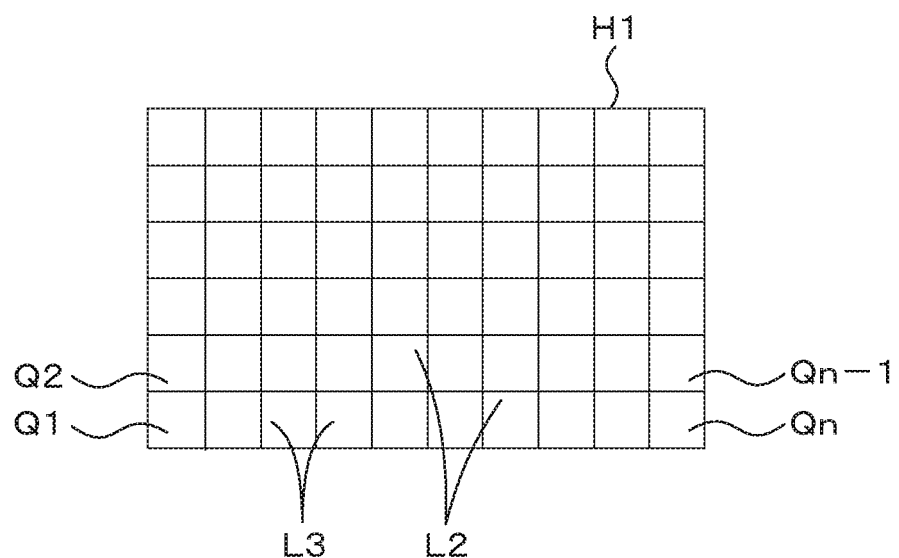
FIG. 6A is a diagram illustrating an example in which a boundary line of an area Qn is in parallel with a contour H1 of a set agricultural field.
Figure 6B:
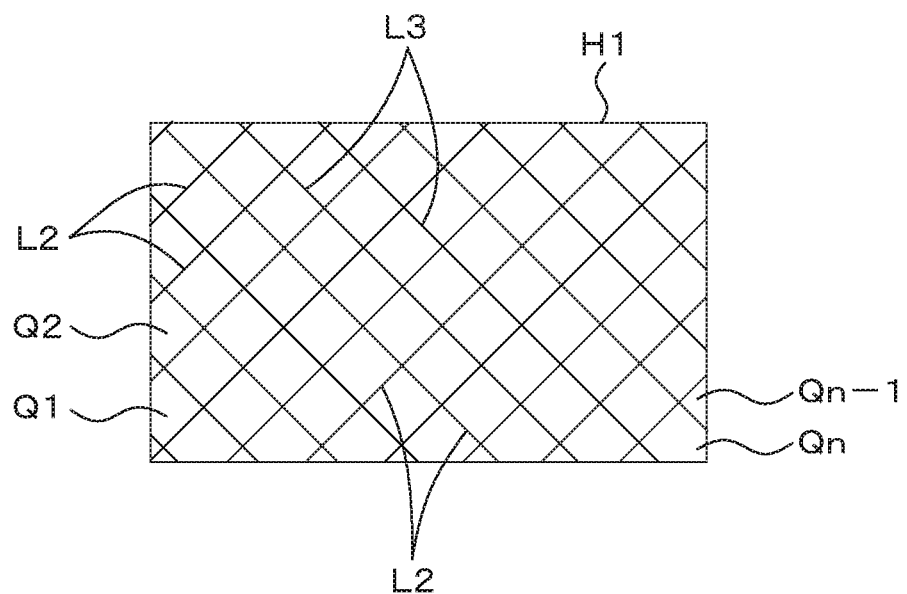
FIG. 6B is a diagram illustrating an example in which the boundary line of the area Qn is inclined with respect to the contour H1 of the set agricultural field.

In this manner, the area setting unit 11B accepts the reference line L1, and sets the areas Qn defined by the accepted reference line L1. Note that optionally changing the positions of the points Ui in the set agricultural field allows the boundary lines L2 and L3 of the areas Qn to be in parallel with the contour H1 of the set agricultural field as illustrated in FIG. 6A, or allows the boundary lines L2 and L3 of the areas Qn to be inclined with respect to the contour H1 of the set agricultural field as illustrated in FIG. 6B.

Meanwhile, in the set agricultural field, there is a case where a length L10 of the set agricultural field, i.e., either a horizontal or vertical length L10 is not an integer multiple of the mesh size in the settings of the areas Qn. In such a case, as illustrated by an arrow W1 in FIG. 7A, sizes of the areas Qn corresponding to the contour H1 of the set agricultural field are smaller than sizes of the other areas Qn.

In a case where the length (horizontal or vertical length) L10 of the set agricultural field is not an integer multiple of the mesh size (the sizes of the areas Qn corresponding to the contour H1 of the set agricultural field are smaller than the sizes of the other areas Qn), the area setting unit 11B changes the areas Qn corresponding to the contour (end) H1 of the set agricultural field.

Figure 7A:
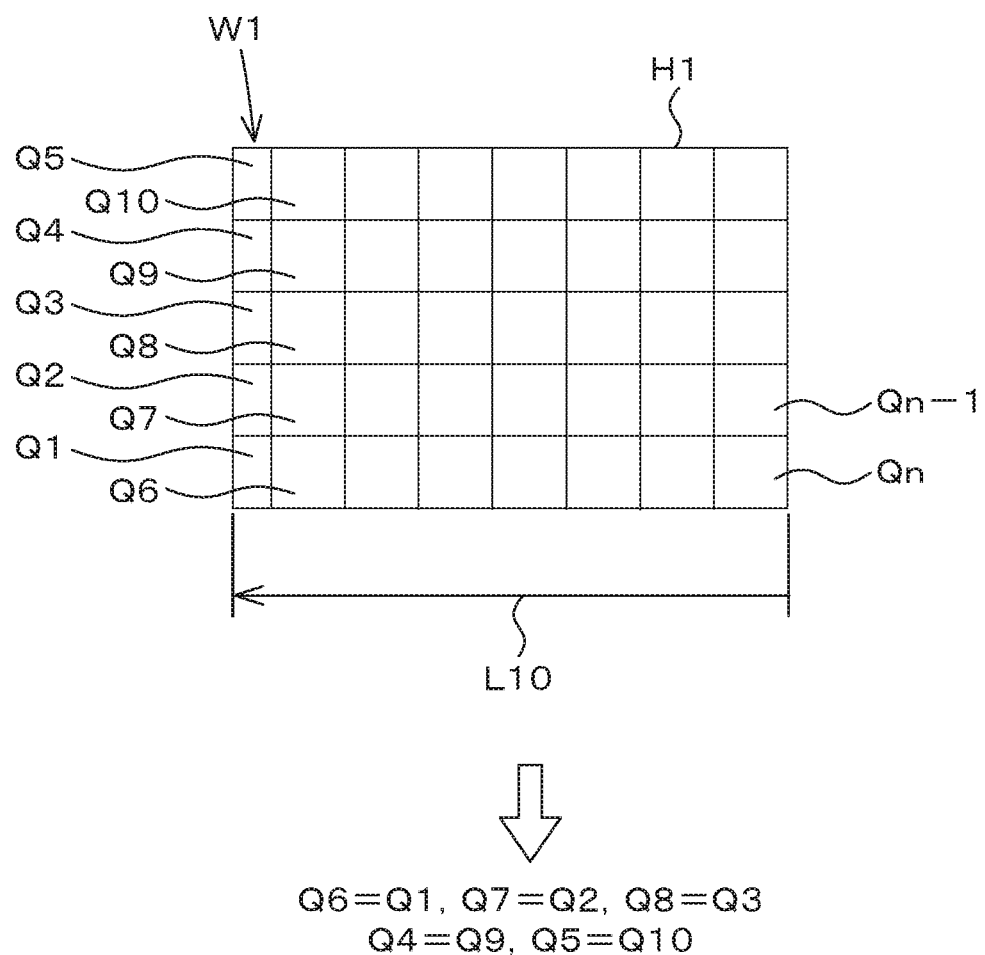
FIG. 7A is a diagram illustrating an example in which a size of the area Qn is smaller than those of the other areas Qn.
Figure 7B:
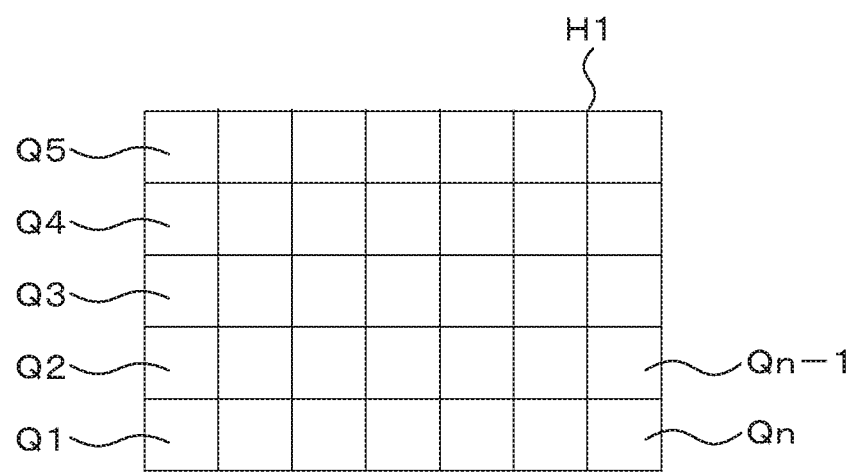
FIG. 7B is a diagram illustrating an example in which the size of the area Qn is corrected.

For example, in a case where the areas Qn corresponding to the contour (end) H1 of the set agricultural field are areas Q1 to Q5 and sizes of the areas Q1 to Q5 are different from sizes of the other areas Qn as illustrated in FIG. 7A, the area setting unit 11B deletes the areas Q1 to Q5 and newly allocates areas Q6 to Q10, which are adjacent to the areas Q1 to Q5, respectively, as the areas Q1 to Q5 to reassociate the areas Qn, as illustrated in FIG. 7B. In this manner, changing the areas Qn can prevent numeric values such as an amount of fertilization in the areas Qn corresponding to the contour (end) H1 of the set agricultural field from becoming extremely small.

The data setting unit 11C associates the area Qn set by the area setting unit 11B and the agricultural data at a predetermined position to each other, and also sets the associated agricultural data as data of each area Qn.

Figure 8:
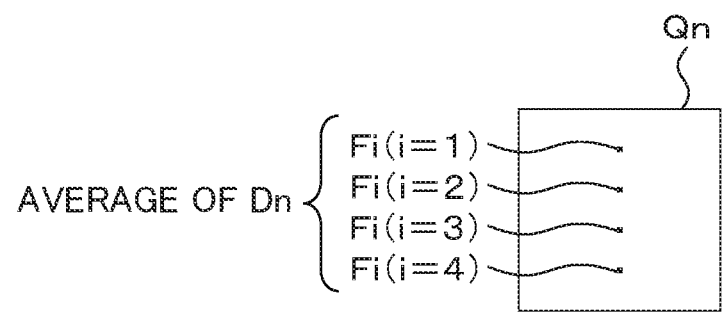
FIG. 8 is a diagram illustrating an example of obtaining the data Dn.

In a case where there is a plurality of pieces of agricultural data Fi (i=1, 2, 3, . . . i) input to one area Qn as illustrated in FIG. 8, for example, the data setting unit 11C averages the pieces of agricultural data Fi input to the area Qn and allocates an average value as data Dn corresponding to the area Qn. In addition, in a case where there is one piece of agricultural data Fi (i=1) input to one area Qn, the data setting unit 11C allocates the agricultural data Fi (i=1) as the data Dn corresponding to the area Qn.

Meanwhile, in a situation where the area Qn is set to the set agricultural field and the data Dn is allocated to the area Qn as illustrated in FIG. 6A, when the area Qn is changed from FIG. 6A to FIG. 6B, that is, the area Qn set by the area setting unit 11B is changed, the data setting unit 11C reassociates the changed area Qn and the data Dn to each other.

That is, assuming that an area Qn before change is an "area Qn before change", data Dn corresponding to the area Qn before change is "data Dn before change", an area Qn after change illustrated in FIG. 7B is an "area Qn after change", and data Dn corresponding to the area Qn after change is "data Dn after change", the data setting unit 11C sets the data Dn after change using the data Dn before change or the like.

Figure 9:
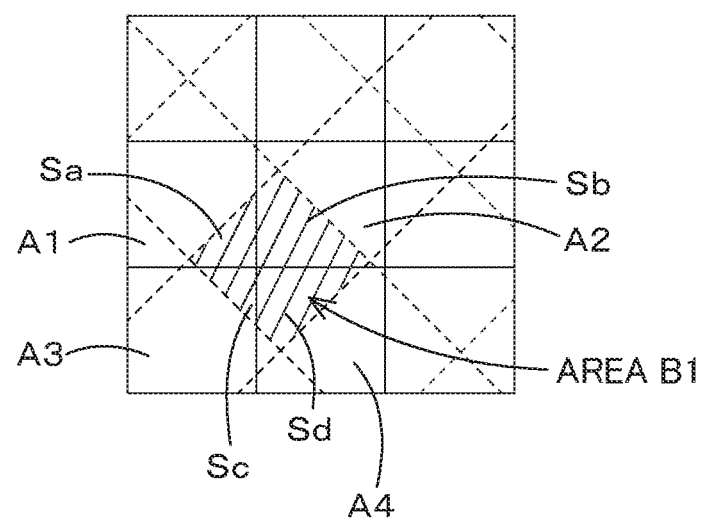
FIG. 9 is a diagram for describing acreage proration.

Specifically, the data setting unit 11C obtains the data Dn after change using acreage proration of an acreage of the area Qn before change (a first acreage S1n), an acreage of the area Qn after change (a second acreage S2n), and an acreage of the data Dn before change. That is, the data setting unit 11C obtains a value of the data Dn after change from an acreage ratio when the area Qn before change and the area Qn after change are overlapped with each other, and the data Dn before change. For example, assuming that a predetermined area in the area Qn after change is an "area B1" and predetermined areas in the area Qn before change overlapping with the area B1 are "areas A1 to A4" as illustrated in FIG. 9, the data setting unit 11C adds values of pieces of data Dn before change corresponding to the areas A1 to A4 to an acreage ratio K1 between an acreage Sa of the area B1 overlapping with the area A1 and an acreage of the area A1, an acreage ratio K2 between an acreage Sb of the area B1 overlapping with the area A2 and an acreage of the area A2, an acreage ratio K3 between an acreage Sc of the area B1 overlapping with the area A3 and an acreage of the area A3, and an acreage ratio K4 between an acreage Sd of the area B1 overlapping with the area A4 and an acreage of the area A4, respectively, to obtain a value of the data Dn after change corresponding to the area B1.

As illustrated in FIG. 1, the agriculture assistance system 1 includes a first spread setting unit 11D and a group setting unit 12. Each of the first spread setting unit 11D and the group setting unit 12 includes an electric/electronic component and/or an electric circuit arranged in the agriculture assistance system 1, and/or a program stored in the agriculture assistance system 1 and/or the like.

The group setting unit 12 sets a group to the data Dn corresponding to each area Qn allocated by the area setting unit 11B. As illustrated in FIG. 3, in a case where group setting information indicating a relationship between the number of groups and a reference value (an upper limit value and a lower limit value) of each group is preliminarily stored in the agriculture assistance system 1, the group setting unit 12 refers to the group setting information, compares the data Dn and the reference value of each group, and allocates a group to each data Dn to set the groups.

As illustrated in FIG. 2, the first display unit 51 displays the data Dn corresponding to each area Qn allocated by the area setting unit 11B as the first agricultural field map M1 (a first display step). The first display unit 51 displays information indicating a group of each data Dn (a numeric value, a text, a color, or the like) set by the group setting unit 12 on the setting screen T1.

Note that regarding display of the data Dn, the present embodiment classifies the data Dn into a plurality of groups based on reference values and displays information indicating the groups on the setting screen T1 to display the data Dn corresponding to each area Qn, but may display a value of the data Dn itself on the setting screen T1.

The first display unit 51 identifies a name of the agricultural field from a position (a latitude and a longitude) included in the agricultural field data, which is a source of the data Dn, to determine to which agricultural field the first agricultural field map M1 corresponds, and displays the identified name of the agricultural field on the basic display unit 53. With this configuration, it is possible to grasp the first agricultural field map M1 displayed by the first display unit 51 by seeing the basic display unit 53.

Note that in a case where a file name of the agricultural field data and the name of the agricultural field are associated to each other, the first display unit 51 may identify the name of the agricultural field from the file name of the agricultural field data, and display the identified name of the agricultural field on the basic display unit 53.

The first spread setting unit 11D sets an amount of spread matters for each area Qn based on the data Dn corresponding to each area Qn on the first agricultural field map M1 (a spread setting step). For example, the first spread setting unit 11D sets the amount of spread matters for each area Qn in correspondence to a set amount of spread matters for each group. In a case where the set amount of spread matters for each group input to the spread input unit 54c is "Pi (i=a group number)", the first spread setting unit 11D determines that the set amount of spread matters Pi is an amount of spread matters Ri for each area Qn.

Specifically, in a case where there are five groups, the first spread setting unit 11D sets a set amount of spread matters P1 set for the first group G1 as an amount of spread matters R1 for each area Qn, a set amount of spread matters P2 set for the second group G2 as an amount of spread matters R2 for each area Qn, a set amount of spread matters P3 set for the third group G3 as an amount of spread matters R3 for each area Qn, a set amount of spread matters P4 set for the fourth group G4 as an amount of spread matters R4 for each area Qn, and a set amount of spread matters P5 set for the fifth group G5 as an amount of spread matters R5 for each area Qn.

That is, the first spread setting unit 11D associates the amount of spread matters Pi for each area Qn and the data Dn corresponding to the area Qn on the second agricultural field map M2 to each other (the amount of spread matters Pi for each area Qn equals to data Dn). In other words, the first spread setting unit 11D also sets the amount of spread matters Pi for each area Qn as the data Dn included in the agricultural data.

The second display unit 52 displays the amount of spread matters Pi for each area Qn (data Dn) set by the first spread setting unit 11D in association to a position of the agricultural field as the second agricultural field map M2. That is, the second display unit 52 classifies the data Dn corresponding to each area Qn set by the first spread setting unit 11D into a preset group, and displays information indicating the group of the data Dn for each area Qn (a numeric value, a text, a color, or the like) on the setting screen T1.

Note that regarding display of the data Dn, the present embodiment classifies the data Dn into a plurality of groups and displays information indicating the groups on the setting screen T1 to display the data Dn corresponding to each area Qn, but may display the value of the data Dn itself (the amount of spread matters Pi for each area Qn) on the setting screen T1. Note that the area Qn displayed on the second display unit 52 is identical to the area Qn set by the area setting unit 11B. That is, in a case where a setting of the area Qn is changed by the area setting unit 11B, the shape of the area Qn displayed on the second display unit 52 is also changed.

In the embodiment described above, the reference value (the upper limit value and the lower limit value) for each group is assumed to be preliminarily stored in the agriculture assistance system 1 when the spread plan is created, but may be freely changed.

Meanwhile, the amount of spread matters for each group is displayed in the embodiment described above, but chemical components of spread matters may be additionally displayed.

The agriculture assistance system 1 includes a component acquiring unit 15 and a component calculation unit 16. Each of the component acquiring unit 15 and the component calculation unit 16 includes an electric/electronic component and/or an electric circuit arranged in the agriculture assistance system 1, and/or a program stored in the agriculture assistance system 1, and/or the like.

As illustrated in FIG. 10, performing an operation of either the mobile terminal 5 or the fixed terminal 6 to give a predetermined instruction to the agriculture assistance system 1 causes the agriculture assistance system 1 to display a setting screen T8.

The setting screen T8 includes a name input unit 100 to which a name of spread matters is input, and a component input unit 101 to which chemical components of spread matters are input. Three major elements of spread matters such as nitrogen (N), phosphorus (P), and potassium (K) can be input to the component input unit 101. When the chemical components are input to the component input unit 101 on the setting screen T8, the component acquiring unit 15 acquires the input components of nitrogen (N), phosphorus (P), and potassium (K).

The setting screen T8 includes the spread input unit 54c to which the set amount of spread matters Pi for each group is optionally input, and a component display unit 54e that displays a component amount Vi corresponding to the set amount of spread matters Pi input to the spread input unit 54c.

The component calculation unit 16 multiplies the set amount of spread matters Pi input to the spread input unit 54c by a chemical component (%) input to the component input unit 101 to calculate the component amount Vi corresponding to the set amount of spread matters Pi.

For example, as illustrated in FIG. 10, in a case where a value of each of nitrogen (N), phosphorus (P), and potassium (K) input to the component input unit 101 is 14%, and a set amount of spread matters P1 (i=1) is 30 kg, the component calculation unit 16 calculates so that a component value V1 (i=1) of each of nitrogen (N), phosphorus (P), and potassium (K) is 4.2 kg. The component display unit 54e displays 4.2 kg as the component value V1 calculated by the component calculation unit 16 in association to a group together with the description of the chemical components (nitrogen (N), phosphorus (P), and potassium (K)).

In the embodiment described above, for example, the set amount of spread matters Pi for the area Q1 is set for a group determined in correspondence to a size of the data Dn in the identical area Q1. That is, in a case where the first group G1 is allocated to the area Q1, set amounts of spread matters P2 to P5 for the second group G2 to the fifth group G5 other than the first group G1 cannot be set to the area Q1. For example, in a case where the first group G1 to the fifth group G5 are set, the set amounts of spread matters P1 to P5 corresponding to the first group G1 to the fifth group G5, respectively, may be able to be set to optional areas Qn.

The agriculture assistance system 1 includes a second spread setting unit 17. The second spread setting unit 17 includes an electric/electronic component and/or an electric circuit arranged in the agriculture assistance system 1, a program stored in the agriculture assistance system 1, and/or the like. The second spread setting unit 17 sets the set amount of spread matters Pi set for each group to an optional area.

Figure 11:
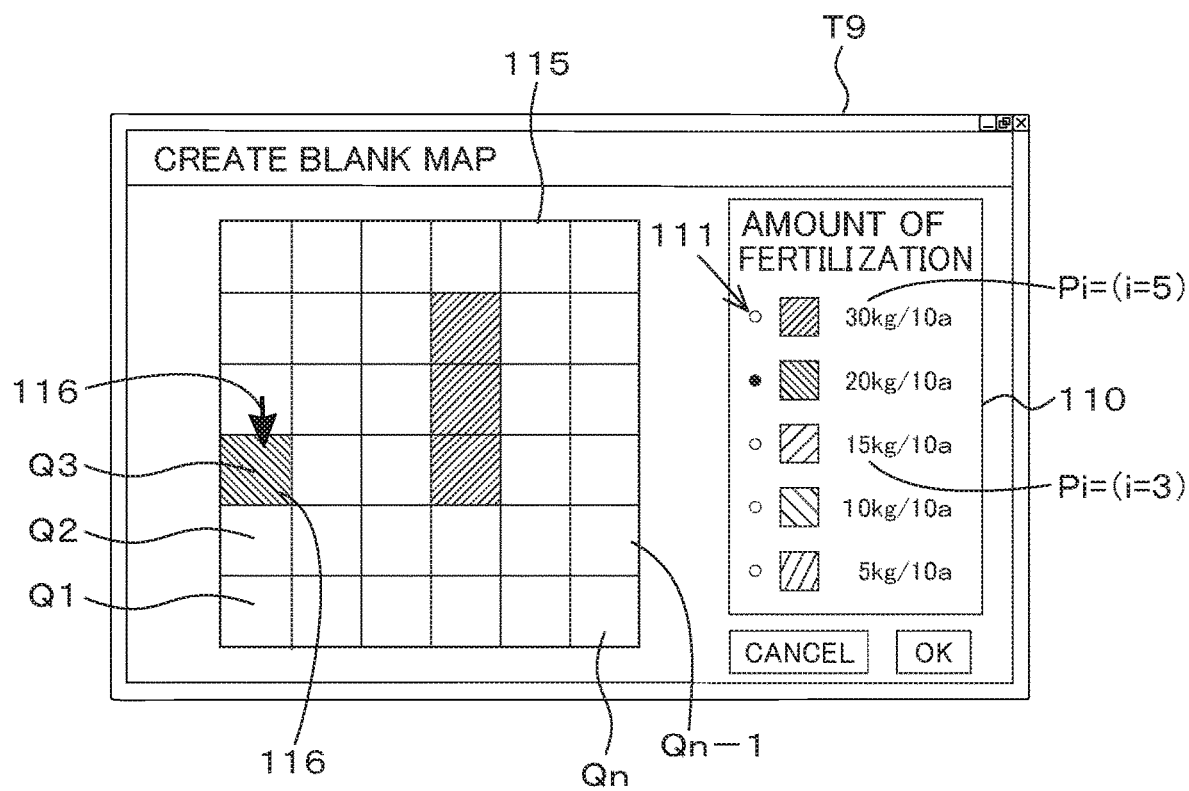
FIG. 11 is a diagram illustrating an example of a setting screen T9.

As illustrated in FIG. 11, performing an operation of either the mobile terminal 5 or the fixed terminal 6 to give a predetermined instruction to the agriculture assistance system 1 causes the second spread setting unit 17 to display a setting screen T9 and also perform processing of the setting screen T9.

The setting screen T9 includes an amount of spread matters display unit 110 and a third display unit 115. The amount of spread matters display unit 110 displays the set amount of spread matters Pi set for each group as described above. The amount of spread matters display unit 110 displays a selection unit 111 for selecting a predetermined amount of spread matters Pi among a plurality of set amounts of spread matters Pi.

The second spread setting unit 17 retains the set amount of spread matters Pi selected in the selection unit 111. For example, while a set amount of spread matters P3 is selected in the selection unit 111, the selected set amount of spread matters P3 is retained.

When either the mobile terminal 5 or the fixed terminal 6 is operated, the second spread setting unit 17 displays a pointer 116. The pointer 116 designates a predetermined area Qn among a plurality of areas Qn displayed on the third display unit 115.

For example, when an area Q3 is selected by the pointer 116 among the plurality of areas Qn, the second spread setting unit 17 allocates the retained set amount of spread matters Pi to the selected area Q3. As described above, in a case where the set amount of spread matters P3 is retained, the second spread setting unit 17 allocates the set amount of spread matters P3 to the area Q3. In this manner, the second spread setting unit 17 performs processing of allocating the set amount of spread matters Pi selected in the selection unit 111 to an optional area Qn selected by the pointer 116.

The third display unit 115 is one of map display units that display data, and displays the area Qn and also displays the set amount of spread matters Pi allocated to the area Qn. For example, the third display unit 115 displays a group (rank) corresponding to the set amount of spread matters Pi for the area Qn in a color, a numeric value, a text, or the like so as to enable identification of the group (rank) preliminarily allocated to each area Qn. Note that the third display unit 115 may directly display a numeric value of the set amount of spread matters Pi.

In the embodiment described above, when displaying the data Dn such as the set amount of spread matters, the map display units (the first display unit 51, the second display unit 52, and the third display unit 115) indicate the boundary lines L2 and L3 to display the area Qn corresponding to the data Dn, but may alternatively display an area Zn different in size from the area Qn without changing the data Dn. In other words, when displaying the data Dn, the map display units (the first display unit 51, the second display unit 52, and the third display unit 115) display a mesh different from the mesh constituting the area Qn.

The setting screen T1 illustrated in FIG. 2 and the setting screen T8 illustrated in FIG. 10 each include a display mesh input unit 64 to which a display mesh is input. The display mesh is a numeric value indicating horizontal and vertical sizes of the area Zn.

When a mesh size (display mesh) different in size from a mesh size (set mesh) input to the size input unit 60 is input to the display mesh input unit 64, the map display units (the first display unit 51, the second display unit 52, and the third display unit 115) display the area Zn defined by boundary lines L4 and L5 corresponding to the display mesh instead of the set mesh, as illustrated in FIG. 12.

Note that in a case where a value of the display mesh and a value of the set mesh are identical, the map display units (the first display unit 51, the second display unit 52, and the third display unit 115) display the area Qn without displaying the area Zn corresponding to the display mesh.

The agriculture assistance system 1 includes the data setting unit 11C, the area setting unit 11B, and the map display units. The data setting unit 11C associates the agricultural data at the predetermined position in the agricultural field and the plurality of areas Qn set in the agricultural field to each other, and sets the associated agricultural data as the data Dn for each of the areas Qn. The area setting unit 11B sets the areas Qn in the agricultural field. The map display units display the data Dn for each of the areas Qn. In a case where the area Qn set by the area setting unit 11B is changed, the data setting unit 11C reassociates the area Qn after change and the data Dn to each other. This enables reassociation of the area Qn after change and the data Dn to each other, and thereby allows the area Qn to be optionally changed and allows the area Qn to be structured in correspondence to the shape of an actual agricultural field and actual agricultural work.

The area setting unit 11B accepts the reference lines to define the area Qn, and sets the area Qn defined by the accepted reference lines. This enables setting of the area Qn defined by the reference lines, and enables, for example, setting of the area Qn defined by boundary lines in parallel with a boundary of the agricultural field, and setting of the area Qn along an optional oblique line.

The area setting unit 11B changes an area Qn corresponding to an end of the agricultural field among the plurality of areas Qn. This enables increase or decrease of a size of the area Qn corresponding to the end of the agricultural field. Assuming that the agricultural field is divided into the plurality of areas Qn, in a case where the area Qn corresponding to the end of the agricultural field is smaller than the other areas Qn or other cases, the area Qn corresponding to the end of the agricultural field can be set to have a size identical to that of the other areas Qn.

The map display units display an area Qn (display mesh) having a size different from that of an area Qn (set mesh) used for setting the data Dn by the data setting unit 11C in the agricultural field. This allows the area (display area) Qn represented by the display mesh to be seen separately from the area (setting area) Qn represented by the set mesh in an overlapping manner. For example, while the set mesh is set as 10.0 m, setting the display mesh as 2.5 m allows the data Dn corresponding to the set area Qn configured by the set mesh of 10.0 m to be seen with the display mesh of 2.5 m, which is finer than the set mesh.

The agriculture assistance system 1 includes the group setting unit 12 and the first spread setting unit 11D. The group setting unit 12 sets a group to the data Dn corresponding to the area Qn. The first spread setting unit 11D sets the amount of spread matters spread over the agricultural field for each group, and sets the set amount of spread matters for each area Qn in correspondence to the data Dn. The map display unit displays the set amount of spread matters for each area Qn in the agricultural field. In a case where grouping is performed in correspondence to a size of the data Dn, the configuration enables, for example, setting of the amount of spread matters for each area Qn in correspondence to a value of the data Dn, and enables checking of the amount of spread matters in the area Qn. That is, the configuration enables precise spreading of spread matters for each area Qn in a variable manner.

The agriculture assistance system 1 includes the group setting unit 12 and the second spread setting unit 17. The group setting unit 12 sets a group to the data Dn corresponding to the area Qn. The second spread setting unit 17 sets the amount of spread matters set for each group to an optional area Qn. The map display units display the set amount of spread matters set for the optional area Qn in the agricultural field. This enables, for example, setting of the amount of spread matters for each group after performing grouping in correspondence to the size of the data Dn, and enables setting (allocation) of the amount of spread matters set for each group to the optional area Qn. That is, an administrator, a worker, and the like can freely set the amount of spread matters in correspondence to the size of the data Dn to the optional area Qn while taking into consideration of a situation of the agricultural field.

The agriculture assistance system 1 includes the component acquiring unit 15 that acquires chemical components of spread matters, and the component calculation unit 16 that calculates component amounts for each group based on the chemical components of spread matters acquired by the component acquiring unit 15 and the amount of spread matters set for each group. This enables grasping of the amounts of chemical components (component amounts) corresponding to spread matters set for each group.

The area setting unit 11B determines, based on the first acreage of the area Qn before change and the second acreage of the area Qn after change, the value of the data Dn displayed on the area Qn after change. This enables, even in a case where the size of the area Qn is changed, reallocation of the data Dn to the area Qn after change without involving an enormous amount of processing.

The agriculture assistance system 1 includes the total amount of spread matters display unit 54*f* that displays the total amount of spread matters spread over the agricultural field. This facilitates grasping of the amount of spread matters of the whole of the agricultural field or the amount of spread matters for each group.

The agriculture assistance system 1 includes the cost display unit 54*d* that displays cost for spreading spread matters. This facilitates grasping of the costs for spreading spread matters.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agriculture assistance system comprising:
    a display controller configured or programmed to cause a display to selectively display, regarding an agricultural field, a map and data indicating screen and an area setting screen,
        the map and data indicating screen including
            a first group indicator to indicate a plurality of groups, and indicate, for each of the groups, a reference value or range of a variation included in agricultural data regarding the agricultural field and a corresponding amount of spread matters to be spread over the agricultural field, a first map of the agricultural field to indicate a plurality of areas set in the agricultural field, and indicate, for each of the areas, one of the groups that corresponds to a value of the variation included in agricultural data regarding the corresponding area, and a second map of the agricultural field to indicate the plurality of areas set in the agricultural field that are the same as the areas indicated by the first map of the agricultural field, and indicate, for each of the areas, one of the groups that corresponds to an amount of the spread matters to be spread over the corresponding area, and the area setting screen indicating the plurality of areas set in the agricultural field to be indicated by each of the first map and the second map of the agricultural field in the map and data indicating screen, and including an area setting input interface operable to set the areas in the agricultural field, change the areas set in the agricultural field, and reset the changed areas in the agricultural field;

an area setting unit configured or programmed to set, change and reset the areas in the agricultural field according to inputting operation via the area setting input interface so that, when the map and data indicating screen is displayed, the first map and the second map of the agricultural field each indicate the plurality of areas set or changed and reset by the area setting unit;

a data setting unit configured or programmed to, when obtaining agricultural data at a position in the agricultural field, associate the agricultural data to one of the areas set in the agricultural field that corresponds to the position so as to determine, for each of the areas set in the agricultural field, a value of the variation included in the agricultural data associated to the corresponding area;

a group setting unit configured or programmed to determine, for each of the areas, based on the reference value or range of the variation for each of the groups, which of the groups corresponds to the value of the variation included in the agricultural data associated to the corresponding area by the data setting unit so that, when the map and data indicating screen is displayed, the first map of the agricultural field indicates the groups determined by the group setting unit; and a first spread setting unit configured or programmed to determine, for each of the groups, how much amount of the spread matters is to be spread over one of the areas set in the agricultural field in correspondence to the reference value or range of the variation for a corresponding one of the groups so that, when the map and data indicating screen is displayed, the first group indicator indicates, for each of the groups, the corresponding amount of the spread matters determined by the first spread setting unit and the second map of the agricultural map indicates the groups corresponding to the respective amounts of the spread matters determined by the first spread setting unit for the respective areas set in the agricultural field; wherein when the plurality of areas are changed and reset in the agricultural field by the area setting unit according to inputting operation via the area setting input interface, the data setting unit is configured or programmed to reassociate the agricultural data to a corresponding one of the areas changed and reset in the agricultural field, and the group setting unit and the first spread setting unit are configured or programmed to perform in correspondence to the reassociation of the agricultural data by the data setting unit so that, when the map and data indicating screen is displayed, each of the first map and the second map of the agricultural field indicates the areas changed and reset in the agricultural field and indicates the groups corresponding to the respective areas changed and reset in the agricultural field.

2. The agriculture assistance system according to claim 1, wherein:
the area setting input interface is operable to draw reference lines in the agricultural field indicated in the area setting screen to define the plurality of areas set in the agricultural area; and
the area setting unit is configured or programmed to set the areas in the agricultural field as defined by the reference lines drawn in the agricultural field indicated in the area setting screen.

3. The agriculture assistance system according to claim 1, wherein, when each of the areas changed and reset in the agricultural field overlaps with at least two of the areas set in the agricultural field before changed and reset, the data setting unit is configured or programmed to determine a value of the variation included in the agricultural data reassociated to the corresponding one of the areas changed and reset in the agricultural field based on what percentage of each of the changed and reset areas each of the at least two of the areas set in the agricultural field before changed and reset accounts for.

4. The agriculture assistance system according to claim 1, wherein the map and data indicating screen includes a total spread matters amount indicator to indicate a total amount of spread matters to be spread over the agricultural field.

5. The agriculture assistance system according to claim 1, wherein the map and data indicating screen includes a cost indicator to indicate cost for spreading the spread matters.

6. The agriculture assistance system according to claim 1, wherein:
the first group indicator includes a spread matters amount input interface operable to input an optional value as the corresponding amount of the spread matters for at least one group of the groups; and
the first spread setting unit is configured or programmed to, when an optional value for the at least one of the groups is inputted via the spread matters amount input interface, determine the inputted optional value as the corresponding amount of the spread matters for the at least one of the groups, so that, when the map and data indicating screen is displayed, the first group indicator indicates, for the at least one of the groups, the inputted optional value as the corresponding amount of the spread matters.

7. The agriculture assistance system according to claim 1, wherein:
the display controller is configured or programmed to cause the display to selectively display, regarding the agricultural field, the map and data indicating screen, the area setting screen and a component indicating screen,
the component indicating screen including
a component setting input interface operable to input a ratio of at least one component in the spread matters to be spread over the agricultural field, and a second group indicator to indicate the groups and indicate, for each of the groups, the corresponding amount of the spread matters to be spread over the agricultural field and a corresponding amount of the at least one component; and the agriculture assistance system further comprises a component calculation unit configured or programmed to produce, for each of the groups, the corresponding amount of the at least one component by multiplying the corresponding amount of the spread matters determined by the first spread setting unit with the ratio of the at least one component inputted via the component setting input interface so that, when the component indicating screen is displayed, the second group indicator indicates, for each of the groups, the corresponding amount of the at least one component produced by the component calculation unit.

8. The agriculture assistance system according to claim 7, wherein:

the second group indicator includes a spread matters amount input interface operable to input, for at least one of the groups, an optional value as the corresponding amount of the spread matters;

the first spread setting unit is configured or programmed to, when an optional value is inputted for at least one of the groups via the spread matters amount input interface, determine the inputted optional value as the corresponding amount of the spread matters for the at least one of the groups.

9. The agriculture assistance system according to claim 7, wherein:

the first group indicator includes a first spread matters amount input interface operable to input, for at least one of the groups, an optional value as the corresponding amount of the spread matters;

the second group indicator includes a second spread matters amount input interface operable to input, for at least one of the groups, an optional value as the corresponding amount of the spread matters;

the first spread setting unit is configured or programmed to, when an optional value is inputted for at least one of the groups via either the first spread matters amount input interface or the second spread matters amount input interface, determine the inputted optional value as the corresponding amount of the spread matters for the at least one of the groups.

10. The agriculture assistance system according to claim 1, wherein:

the display controller is configured or programmed to cause the display to selectively display, regarding the agricultural field, the map and data indicating screen, the area setting screen and a spread matters amount setting screen, the spread matters amount setting screen including a group selector indicating the groups and the corresponding amount of the spread matters for each of the groups, the group selector operable to select one of the groups and a third map of the agricultural field to indicate the areas set in the agricultural field as indicated by each of the first map and the second map of the agricultural field or changed and reset via the area setting input interface; and the agriculture assistance system further comprises a second spread setting unit configured or programmed to determine, for each of the areas, an amount of the spread matters in such a manner that, when the spread matters amount setting screen is displayed, one of the groups is selected via the group selector, and then one or more areas are selected from the areas indicated by the third map of the agricultural field to determine, for the selected one or more areas, the amount of the spread matters corresponding to the selected one of the groups.

* * * * *